United States Patent [19]

Zimmerman

[11] Patent Number: 4,800,718
[45] Date of Patent: Jan. 31, 1989

[54] SURFACE COOLING SYSTEM

[75] Inventor: Anthony M. Zimmerman, Palm Beach Gardens, Fla.

[73] Assignee: The United States of America as represented by the Secretary of the Air Force, Washington, D.C.

[21] Appl. No.: 946,541

[22] Filed: Dec. 24, 1986

[51] Int. Cl.[4] .............................................. F02K 3/04
[52] U.S. Cl. ......................................... 60/264; 60/757; 239/127.3; 239/265.17
[58] Field of Search ................ 60/264, 265, 757, 755, 60/271, 262; 239/127.3, 265.17

[56] References Cited

U.S. PATENT DOCUMENTS

| | | | |
|---|---|---|---|
| 2,658,337 | 11/1953 | Clarke et al. | 60/757 |
| 2,705,399 | 4/1955 | Allen | 60/265 |
| 3,062,566 | 11/1962 | Coburn . | |
| 3,167,909 | 2/1965 | Thielman | 60/265 |
| 3,307,354 | 3/1967 | Macaulay et al. | 60/757 |
| 3,910,039 | 10/1975 | Fortini | 60/265 |
| 3,925,982 | 12/1975 | Mueller . | |
| 3,925,983 | 12/1975 | LaBotz | 60/265 |
| 4,000,612 | 1/1977 | Wakeman et al. . | |
| 4,050,241 | 9/1977 | Dubell | 60/757 |
| 4,184,326 | 1/1980 | Pane, Jr. et al. | 60/757 |
| 4,242,871 | 1/1981 | Breton | 60/757 |
| 4,361,010 | 11/1982 | Tanrikut et al. | 60/757 |
| 4,700,544 | 10/1987 | Fucci | 60/757 |

Primary Examiner—Donald E. Stout
Attorney, Agent, or Firm—Bobby D. Scearce; Donald J. Singer

[57] ABSTRACT

A cooling system for providing a layer of relatively cool gas (28) adjacent the surface of a duct (24) carrying a flow of relatively hot gas (22) includes an elongated louver nozzle (32), an elongated plenum (40) and one or more crosswise dividers (42) for separating the plenum and nozzle into a plurality of individual segments (40, 40a; 32, 32a) having sized supply orifices (44, 44a) disposed therein.

1 Claim, 1 Drawing Sheet

SURFACE COOLING SYSTEM

The Government of the United States of America has rights in this invention.

FIELD OF THE INVENTION

This invention pertains to a system for cooling the surface of a duct conveying a heated fluid or the like.

BACKGROUND OF THE INVENTION

The requirements and benefits of cooling the surface of a duct carrying a high temperature fluid, such as the exhaust duct of a gas turbine engine, are well known and have long been the subject of technical development. One effective method for achieving such interior duct surface cooling is to establish and maintain a layer of relatively cool fluid adjacent the surface to prevent contact with the conducted heated fluid.

For continuous protection around the entire duct perimeter and along the entire duct length, it has been found advantageous to use a louver type system for introducing the layer of relatively cool fluid adjacent the duct surface. The louvers are oriented substantially transverse with respect to the heated fluid flow, circumscribing the duct perimeter and being disposed at one or more axial distances along the duct length.

U.S. Pat. No. 3,925,982 issued to Mueller shows an axisymmetric rocket nozzle having a plurality of louver like openings disposed about the perimeter of the inner nozzle surface. Each axial location of a louver is supplied with cooling fluid by an external manifold.

The Mueller system and similar methods for maintaining the cooling layer adjacent the duct surface are well suited for round, axisymmetric duct cross sections wherein the static pressure gradient of the conducted fluid varies only in the axial flow direction. Such systems are less effective, however, in asymmetric flow configurations, such as square, rectangular, or thrust vectoring duct configurations wherein the static pressure gradient within the duct varies not only streamwise, but also between various locations about the duct perimeter.

As will be appreciated by those skilled in the art, a cooling fluid supply manifold disposed about the perimeter of a duct having a non-uniform perimeter static pressure distribution will deliver a greater volume of cooling fluid to the relatively low pressure locations at the duct surface and somewhat less volume to the relatively high pressure locations. In extreme cases of pressure imbalance about the perimeter, the ingestion of hot fluid into the louver and/or supply manifold may occur, possibly causing rapid deterioration of the duct surface and cooling supply system as a result of local overheating. Increasing the overall cooling fluid delivery rate to insure that no portion of the duct perimeter is without sufficient cooling flow results in overcooling of the relatively low pressure locations within the duct.

What is needed is a cooling system able to establish and maintain a uniform layer of cooling fluid adjacent the surface of a duct having a non-uniform surface static pressure distribution about the duct perimeter.

SUMMARY OF THE INVENTION

It is therefore an object of the present invention to provide a cooling system for a duct conveying a relatively high temperature fluid, such as an exhaust duct of a gas turbine engine, or the like.

It is further an object of the present invention to establish and maintain a flowing layer of a relatively cool fluid adjacent the interior duct surface.

It is further an object of the present invention to provide a sufficiently protective layer of relatively cool fluid independent of the local fluid static pressure within the duct.

According to the present invention, the interior surface of a heated fluid conveying duct is protected by introducing and maintaining a flowing layer of a relatively cool fluid between the duct surface and the heated fluid. The cooling fluid layer is established by one or more elongated louver nozzles disposed transverse to the general flow of the heated fluid and oriented so as to discharge the cool fluid adjacent the duct surface and in the same general direction as the flowing heated fluid.

The louver nozzle is connected along its operative length with an elongated plenum and the joined plenum-nozzle structure is divided into a plurality of distinct segments by one or more crosswise flow dividers disposed therein.

Each plenum segment receives a predetermined flow of cool fluid which is discharged adjacent the duct surface through the corresponding louver nozzle segment. The volume of cooling fluid admitted to each plenum segment is determined responsive to the local fluid static pressure at the duct surface adjacent the louver nozzle opening as well as the local surface cooling requirement.

By selecting the volume of cooling fluid discharged by each nozzle segment, the cooling system of the present invention is able to maintain a uniform layer of cooling fluid at the duct surface independent of any local pressure variation common in asymmetric ducts or the like. A further advantage of the distinct plenum and nozzle segments is provided by the decreased likelihood of ingestion of a flow of relatively hot fluid into the plenum nozzle structure as a result of a static pressure imbalance.

By admitting the cooling fluid into each plenum segment through a sized supply orifice opening into a surrounding cooling annulus, the cooling system according to the present invention can accommodate both transverse and streamwise static pressure and cooling fluid volume variations, thus establishing and maintaining the proper cooling fluid layer over the entire duct interior surface. Both these and other features and advantages of the cooling system according to the present invention will be apparent to those skilled in the art upon review of the following specification and the appended claims and drawing figures.

DETAILED DESCRIPTION OF THE PREFERRED EMBODIMENT

Figure 1:
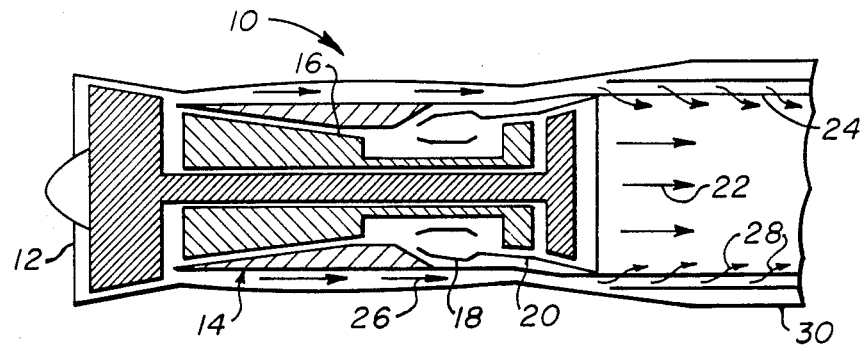
FIG. 1 shows a schematic cross section of a gas turbine engine and outlet exhaust duct conveying the high temperature engine exhaust.

Referring now to the drawing Figures, and in particular to FIG. 1 thereof, the general environment of the invention will be described. FIG. 1 shows a schematic representation of a turbofan engine 10 having an inlet 12 for ingesting a flow of ambient air, an axial flow core engine 14 including a compressor section 16, a combustor section 18, and a turbine section 20. The turbine section 20 discharges a stream of relatively high temperature exhaust gas 22 into the turbine exhaust duct 24 as shown.

The exhaust duct 24 is cooled by passing a portion of the annularly flowing, unheated fan stream 26 through the duct 24 and establishing a layer of relatively cool air 28 adjacent the duct surface. Any remaining fan air 26 is discharged from the fan annulus 30 at the downstream end of the engine 10.

Duct surface cooling system arrangements such as that shown in FIG. 1 may include a plurality of axially spaced louver vents running about the perimeter of the duct 24 for delivering a uniform flow of cooling air adjacent the interior duct surface as well as a plurality of individual air flow openings distributed over the duct surface. Such systems take advantage of the higher static pressure in the fan annulus 30 to drive a portion of the relatively cool fan air 26 into the exhaust duct 24 adjacent the inner surface. As discussed hereinabove, such prior art systems are best suited for axisymmetric ducts having a uniform static pressure distribution about the perimeter thereof.

Recent designs of gas turbine engine exhaust ducts have included both asymmetric nozzle designs, such as rectangular, square, etc., as well as thrust vectoring designs wherein the exhaust gases may be redirected by movable duct surfaces. Such systems result in non-uniform static pressure distributions over the interior duct surface both circumferentially as well as in the streamwise direction and causing uneven distribution of cooling air 28 adjacent the duct 24 in prior art arrangements.

Figure 2:
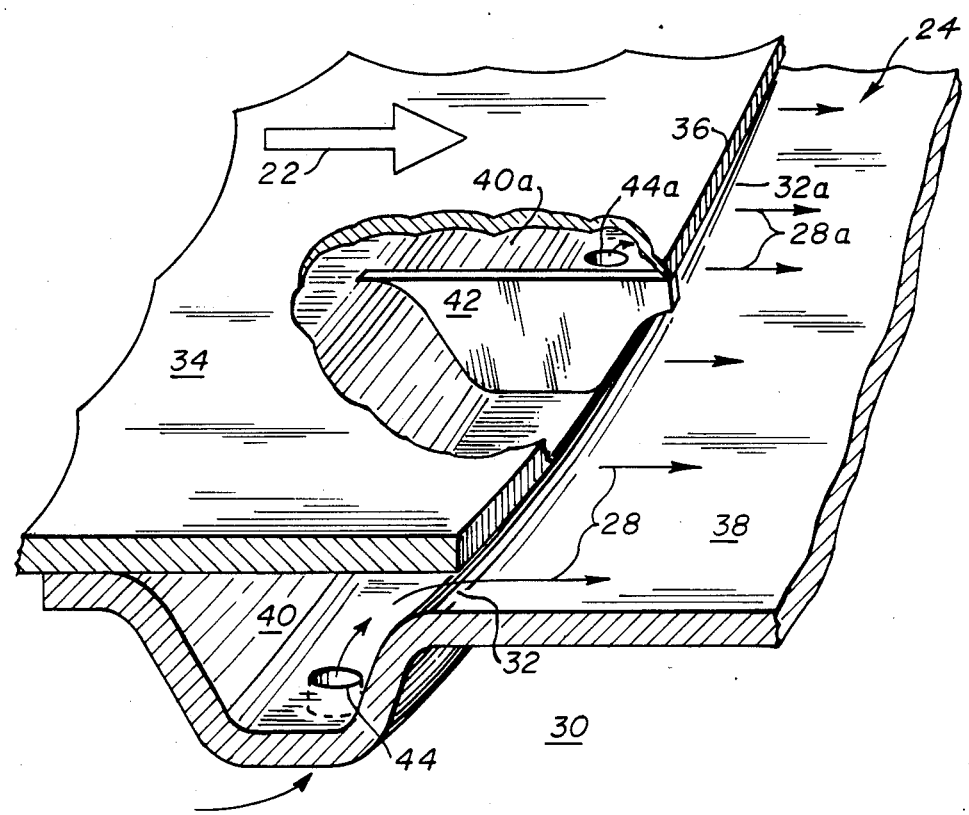
FIG. 2 shows a detailed view of a divided plenum and louver nozzle according to the present invention.

FIG. 2 shows a detailed view of a louver nozzle 32 according to the present invention. The duct 24 includes a first upstream duct wall 34 terminating in a downstream edge or lip 36 and a second duct wall 38 spaced radially outward relative to the first surface lip 36 for defining the elongated louver nozzle 32 therebetween.

The second duct wall 38 and the first duct wall 34 further define an elongated plenum 40 disposed adjacent the louver nozzle 32 and in fluid communication therewith along the entire length of the louver nozzle 32. The linked plenum and louver nozzle 32 are both divided into a plurality of segments 40a, 32a by one or more crosswise flow dividers 42 which separate adjacent plena 40, 40a, and nozzles 32, 32a, as shown in FIG. 2. The flow dividers 42 prevent circumferential flow of the cooling air 28 in response to any transverse pressure differential within the duct 24.

Each plenum segment 40, 40a is supplied with a respective volume of cooling air 28, 28a by corresponding supply orifices 44, 44a. The supply orifices are sized to provide a predetermined volume of cooling air 28, 28a in response to the expected or measured surface static pressure local to the corresponding louver nozzle 32, 32a as well as in response to the local cooling requirements of the duct surface. The number of individual plenum and nozzle segments in a particular cooling system design is a function of the static pressure variation over the perimeter of the duct, the variation in the local duct surface cooling requirement, and other local parameters which can influence the local required cooling gas flow.

As will be appreciated by those skilled in the art, the use of one or more sized orifices 44 to supply cooling air 28 to an individual plenum segment 40 allows the delivered volume of cooling air 28 to be easily adapted to changed or unexpected increases in the local cooling air volume requirements by merely resizing the individual orifices 44. In this fashion, an unexpected local "hot spot" at the duct surface may be locally supplied with an additional flow of cooling air 28 without altering the cooling air distribution over the remainder of the duct 24.

The combination of sized orifices 44, 44a and the corresponding plenum and nozzle arrangement 40, 32 and 40a, 32a results in a regulated flow of cooling air 28, 28a to each segment which is subsequently smoothly distributed as a uniform flowing layer at the downstream surface 38.

The present invention is thus well suited for providing the desired volume of cooling air adjacent the interior surface of a duct conveying a heated fluid and independent of any internal pressure variation at the duct surface.

I claim:

1. Liner structure for a hot gas duct in a gas turbine engine or the like, comprising:
    (a) substantially coaxial inner and outer walls having respective upstream and downstream ends and defining a duct for conducting hot gas from an upstream end to a downstream end thereof;
    (b) said inner and outer walls circumferentially joined near respective upstream ends thereof and spaced downstream thereof to define a circumferential plenum having a closed upstream end and an open downstream end defining a circumferential opening between respective downstream ends of said inner and outer walls;
    (c) a plurality of axially extending wall members disposed within said plenum between said inner and outer walls dividing said plenum into a corresponding plurality of circumferential plenum segments;
    (d) means, in said outside wall defining an inlet into each respective plenum segment, for selectively conducting gaseous coolant into each said respective plenum segment; and
    (e) said inner wall terminating at the downstream end thereof near and downstream of said circumferential opening, said downstream end of said inner wall being spaced from said outer wall a preselected distance to define a circumferential louver at each said plenum segment for directing said gaseous coolant along the surface of said outer wall defining said duct downstream of each said louver.

* * * * *